(12) United States Patent
Vinegar et al.

(10) Patent No.: US 6,543,539 B1
(45) Date of Patent: Apr. 8, 2003

(54) PERFORATED CASING METHOD AND SYSTEM

(75) Inventors: Harold J. Vinegar, Houston, TX (US); George L. Stegemeier, Houston, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 09/716,366

(22) Filed: Nov. 20, 2000

(51) Int. Cl.[7] .......................... E21B 43/12; E21B 43/22; E21B 43/24
(52) U.S. Cl. .................. 166/296; 166/205; 166/317; 405/128.75; 405/128.85
(58) Field of Search .......................... 166/164, 296, 166/317, 205, 57; 405/128.15, 128.5, 128.6, 128.75, 128.85, 131

(56) References Cited

U.S. PATENT DOCUMENTS

| | | | | |
|---|---|---|---|---|
| 128,126 | A | * 6/1872 | Danforth et al. | |
| 2,401,035 | A | * 5/1946 | Akeyson et al. | |
| 3,057,405 | A | * 10/1962 | Mallinger | |
| 3,163,218 | A | * 12/1964 | Allen et al. | |
| 3,272,641 | A | * 9/1966 | Bourne | |
| 3,322,199 | A | * 5/1967 | Van Note, Jr. | |
| 3,386,510 | A | * 6/1968 | Schnabel, Jr. | |
| 3,614,986 | A | * 10/1971 | Gill | 166/303 |
| 3,684,037 | A | 8/1972 | Bodine | |
| 3,880,233 | A | * 4/1975 | Muecke et al. | |
| 4,982,788 | A | * 1/1991 | Donnelly | |
| 5,062,484 | A | * 11/1991 | Schroeder, Jr. et al. | |
| 5,310,000 | A | * 5/1994 | Arterbury et al. | |
| 5,318,116 | A | 6/1994 | Vinegar et al. | |
| 5,403,119 | A | * 4/1995 | Hoyle | |
| 5,775,840 | A | * 7/1998 | Kneiper et al. | |
| 6,039,508 | A | 3/2000 | White | |
| 6,237,688 | B1 | * 5/2001 | Burleson et al. | 166/281 |

* cited by examiner

Primary Examiner—David Bagnell
Assistant Examiner—Daniel P Stephenson
(74) Attorney, Agent, or Firm—Meyertons, Hood, Kivlin, Kowert & Goetzel, P.C.; Eric B. Meyertons

(57) ABSTRACT

A perforated casing may be placed within contaminated soil. Perforations within the casing may be covered during insertion of the casing into the ground. Covering the perforations may inhibit plugging of the perforations during installation. Covering the perforations may also inhibit worker exposure to contaminant dust or vapors during insertion of the casing into the ground. The covering for the perforations in a casing may be plugs that are placed or formed in the casing perforations. Alternately, the covering for the perforations may be a sleeve placed adjacent to the perforations. After installation of the casing, heating or chemically treating the perforation coverings may remove the coverings and allow insertion or removal of fluids and vapor through the casing.

67 Claims, 12 Drawing Sheets

PERFORATED CASING METHOD AND SYSTEM

BACKGROUND OF THE INVENTION

1. Field of the Invention

The present invention relates to soil treatment by injecting or removing fluid, and certain embodiments relate to perforated casings that may be installed in the ground as a part of a soil remediation system. The perforated casings may be inserted into the soil without plugging openings in the casings. The perforated casings may be inserted into the soil without vapor or dust being transported from the soil to the surface through the casing.

2. Description of Related Art

Contamination of subsurface soils has become a matter of concern in many locations. Subsurface soil may become contaminated with chemical, biological, and/or radioactive contaminants. Contamination of subsurface soil may occur in a variety of ways. Hazardous material spills, leaking storage vessels, and landfill seepage of improperly disposed of materials are just a few examples of the many ways in which soil may become contaminated. Contaminants in subsurface soil can become public health hazards if the contaminants migrate into aquifers, into air, or into the food supply. Contaminants in subsurface soil may migrate into the food supply through bio-accumulation in various species that are part of the food chain.

There are many methods for removal of contaminants from subsurface soil. Some possible methods for treating contaminated subsurface soil include excavation followed by incineration, in situ vitrification, biological treatment, and in situ chemical treatment. Although these methods may be successfully applied in some applications, the methods can be very expensive. The methods may not be practical if many tons of soil must be treated.

Another method that may be used to remove contaminants from subsurface soil is a soil vapor extraction (SVE) process. An SVE process applies a vacuum to a production well to draw air through subsurface soil. The air carries volatile contaminants towards the source of the vacuum. Air, water, contaminants and other material may be removed as off-gas from the soil by the vacuum. The off-gas may be transported to a treatment facility. The off-gas removed from the soil may be processed in the treatment facility to eliminate or reduce contaminants within the off-gas to acceptable levels. An SVE process may allow contaminants to be removed from soil without the need to move or significantly disturb the soil. An SVE process may operate under roads, foundations, and other fixed structures.

In situ thermal desorption (ISTD) may be used to increase the effectiveness of an SVE process. An ISTD soil remediation process involves in situ heating of the contaminated soil to raise the temperature of the soil while simultaneously removing off-gas by vacuum. In situ heating may be preferred over convective heating by the introduction of a hot fluid (such as steam) into the soil because thermal conduction through soil is very uniform as compared to mass transfer through soil. Thermal conductivity of an average soil may vary by a factor of about two throughout the soil. Fluid flow conductivity of an average soil may vary by a factor of $10^8$ throughout the soil.

Soil may be heated by a variety of methods. Methods for heating soil include, but are not limited to, heating by thermal conduction, heating by radio frequency heating, or heating by electrical soil resistivity heating. Thermal conduction heating may be advantageous because thermal conductive heating is not limited by the amount of water present in the soil. Also, soil temperatures substantially above the boiling point of water may be obtained using thermal conductive heating. Soil temperatures of about 212° F., 250° F., 300° F., 400° F., 750° F., 1000° F. or greater may be obtained using thermal conductive heating. Heaters may be placed in or on the soil to heat the soil. Thermal conductive heating of soil may include radiatively heating a well casing, which conductively heats the surrounding soil. Coincident or separate source vacuum may be applied to remove vapors from the soil. Vapor may be removed from the soil through production wells. U.S. Pat. No. 5,318,116 issued to Vinegar et al. and U.S. patent application Ser. No. 09/549,902, both of which are incorporated by reference as if fully set forth herein, describe ISTD processes for treating contaminated subsurface soil with thermal conductive heating.

A production well may be inserted into the soil. The production well may be placed, vibrated and/or driven into the soil. The production well may include a perforated casing that allows vapor to pass from the soil into the production well. The perforations in the casing may be, but are not limited to, holes and/or slots. The perforations may be screened. The casing may have several perforated zones at different positions along a length of the casing. When the casing is inserted into the soil, the perforated zones may be located adjacent to contaminated layers of soil. The areas adjacent to perforated sections of a casing may be packed with gravel or sand. The casing may be sealed to the soil adjacent to non-producing layers to inhibit migration of contaminants into uncontaminated soil.

In some soil remediation processes, it may be desirable to insert a fluid into the soil. The fluid may be, but is not limited to, a heat source such as steam, a solvent, a chemical reactant such as an oxidant, or a biological treatment carrier. A fluid, which may be a liquid or gas, may be inserted into the soil through an injection well. The injection well may include a perforated casing. The injection well may be similar to a production well except that fluid is inserted into the soil through perforations in the well casing instead of being removed from the soil through perforations in the well casing.

A well may also be a test well. A test well may be used as a gas sampling well to determine the location and concentration of contaminants within the soil. A different type of test well may be used as a logging observation well.

A production, injection or test well may be placed into an augered hole. Cuttings made during the formation of the augered hole may have to be treated separately from the remaining soil. Some soil may be contaminated with extremely toxic chemicals or radioactive contaminants. Augering a hole for a production or injection well may not be feasible because forming the hole would expose workers and the environment to contaminated dust or vapors. For example, soil may be contaminated with a combination of radioactive contaminants, such as plutonium, and organic contaminants. It may be desirable to remediate the soil to inhibit migration of the organic contaminants into adjacent soil. Exposure of workers to even small amounts of dust from plutonium contaminated soil during installation or operation of a soil remediation system may result in illness or death.

As an alternative to placing a production, injection or test well into an augered hole, a well may be inserted into the ground by vibrating or driving the well into the ground. U.S.

Pat. No. 3,684,037 issued to Bodine and U.S. Pat. No. 6,039,508 issued to White describe devices for sonically drilling wells. Both of these patents are incorporated by reference as if fully set forth herein. During placement of a perforated casing into the ground, soil may fill and plug the openings in the casing. Plugged openings may inhibit or significantly reduce removal of off-gas from soil adjacent to the well.

SUMMARY OF THE INVENTION

A production, injection or test well for a soil remediation system may include a perforated casing. The casing may be an elongated conduit for introduction or removal of material into or out of the soil. The casing may have any cross sectional shape, including, but not limited to, circular, oval, polygonal, irregular, or rectangular. Perforations in the casing may be, but are not limited to, circular holes, oval holes, irregular shaped, and slots. The casing may be inserted into soil without the soil plugging openings of the perforated casing. In an embodiment, removable material may cover the openings during placement of the casing in soil. The removable material may inhibit openings in the casing from being partially or completely plugged by soil during the placement of the casing in the soil. The removable material may also inhibit transportation of dust and/or vapor through the casing during the placement of the casing into the soil. After the casing is placed into the soil the removable material may be removed by applying heat or chemical treatment to the removable material. The removable material may be removed by, but is not limited to being removed by, melting, vaporizing, dissolving, or reacting the material. The removable material may be a sleeve that is placed adjacent to the openings. Alternatively, the removable material may be plugs that are inserted or formed in each of the openings. In an alternate embodiment, openings in the casing may be oriented so that material is not packed into the openings during placement of the casing into the soil.

A removable material for plugging openings in a well casing may be, but is not limited to, a hydrocarbon, metal, metal alloy, plastic, polymer, or salt. Preferably, the removable material has good adhesion characteristics with the casing, has abrasion and melting point characteristics that allow the casing to be inserted into the ground without allowing the perforations to open, and has wetting characteristics with dry soil. The removable material should be non-toxic, and any breakdown products of the removable material should also be non-toxic. Good adhesion characteristics allow the removable material to form a seal with the casing to inhibit off-gas from escaping through the casing during placement of the casing into the soil. Contact between the casing and the soil may cause some of the removable material to abrade during placement of the casing into the soil. Good abrasion resistance characteristics may allow the casing to be placed into the soil without perforations of the casing becoming opened. During placement of a perforated casing into the soil, the temperature of the casing may increase due to vibration and friction with the soil. The melting point of the removable material and the size of the plug should allow the casing to be inserted into the soil without the perforations in the casing being opened. When the removable material is treated to open the perforations, a portion of the removable material or a breakdown product of the removable material may flow into the soil. Preferably, the removable material and/or the breakdown product has wetting characteristics with dry packing and/or soil adjacent to the well. The wetting characteristics may help to consolidate the packing and/or soil adjacent to the casing.

Openings in a casing of a well may be, but are not limited to, slots or holes. The openings may extend at an angle through a wall of the casing so that a low point of an opening in an outer surface of the casing is above a low point of the opening in an inner surface of the casing. In an embodiment, the openings in the casing are slanted outwards and upwards relative to the ground surface and an inner surface of the casing, and the openings of the casing are not covered during insertion of the casing into the ground. As the casing is placed into the ground, the slant of the openings inhibits material from being packed into the openings. In alternate embodiments, the openings in the casing are slanted outwards and upwards relative to an inner surface of the casing, and the openings of the casing are covered during insertion of the casing into the ground. The slant of the openings may allow material to flow into the casing if the removable material is removed by heating. The removable material may flow to a sealed bottom portion of the casing. In alternate embodiments, the openings have substantially no slant or an outward and downward slant relative to the ground surface and an inner surface of the casing. The un-slanted or downwardly slanted openings are covered during insertion of the casing into the ground to inhibit plugging and transmittal of dust and vapor to the atmosphere. Preferably, the removable material is vaporized or otherwise altered when the openings are exposed by heating or chemical treatment. The vaporization or alteration of the removable material may allow complete removal of the removable material from the casing and from soil adjacent to the casing.

In an embodiment, the removable material may be a hydrocarbon, metal, metal alloy, plastic, polymer, or salt that is dissolved by a chemical. The chemical may be, but is not limited to, an acid, a base, an oxidizer and/or a solvent. In other embodiments, steam or another fluid may be circulated within the casing to open the perforations in the casing after the casing has been installed in the ground.

Removable material may be placed in the perforations of a casing in a variety of ways. Individual plugs may be inserted into openings in the casing. The plugs may be held in place by a friction fit between the casing and the openings. The plugs may include flared ends that contact an inner surface of the casing and hold the plugs within the openings. The shape of the openings in the casing may help to retain the plugs within the casing. For example, the openings in the casing may have large areas in an outer surface of the casing. The openings may taper to smaller openings in an inner surface of the casing. The smaller openings at the inner surface of the casing may inhibit the plugs from being pushed into the casing during placement of the casing into the soil. Also, the plugs may tighten against the casing wall when a vacuum is pulled within the well. Alternately, the removable material may be melted, flowed into the openings, and allowed to harden. Excess removable material may be removed from the casing. The removable material may be a sleeve that is positioned against a surface of the casing. Preferably, the sleeve is placed and sealed to the outer surface of the casing, although in certain embodiments, the sleeve may be an inner lining placed against an inner surface of the casing.

A casing may include a screen or packing. In an embodiment, the casing may include a mesh screen. The mesh screen may have openings that are filled with a removable material during placement of the screen within the casing. In an alternate embodiment, the casing may include a wire wrap screen. The openings between the wraps may be filled with removable material. In addition to the openings in the screen, openings in a casing wall of a casing that has screen may also be filled with removable material. A casing may include packing. For example, a portion of the casing may be packed with sintered porous metal bead pack. The packing may be filled or blocked with removable material during installation of the casing into the ground.

In an embodiment, the material that forms the casing or a portion of the casing may be removable material. Such a casing may be fitted with a screen or a porous consolidated packing. For example, the casing may include or be a section of polyethylene pipe. A screen or packing may be placed within the pipe. After insertion of the pipe into the ground, the pipe or a portion of the pipe may be removed by melting and/or reacting the material of the pipe.

A production, injection or test well may be a pipe or pipe string that has a circular cross sectional shape. In some embodiments, the well may be a piling that has a rectangular or irregular cross sectional shape. U.S. Pat. No. 5,403,119 issued to Hoyle, and incorporated by reference as if fully set forth herein, describes production and injection wells that are pilings. A production or injection well that has a non-circular cross sectional shape may be driven into the ground by a pile driver, vibrated into the ground, or placed within a trench. An end of the piling may have a "V" shape to facilitate entry of the piling into the ground. The thickest part of the piling may be located in the "V" shaped end. As the piling is driven into the soil, the soil above the thickest portion of the "V" shaped end may rebound. The rebounding soil may provide a region of non-compacted soil adjacent to the piling.

A production, injection or test well that has a circular cross section shape may include an end that may be driven or vibrated into the soil. The end may be pointed to facilitate insertion of a well casing into the soil. In an embodiment of a casing that has a circular cross section, a maximum outer diameter of the end is larger than an outer diameter of the casing. The larger end may facilitate driving the well into the ground. As the end is driven into the soil, the opening created by the end will be larger than the outer diameter of the casing. As the casing is driven into the soil, the soil above the maximum diameter of the end may partially rebound. The rebounding soil may provide a region of non-compacted soil adjacent to the casing. In an alternate embodiment of a circular cross section shape casing with a pointed end, the end of the casing may have a maximum diameter that is substantially the same as the diameter of casing.

A perforated well casing may be placed in the ground in several ways, including, but not limited to, placing the well casing into an augered hole or trench, vibrating the well into the ground, or driving the well into the ground. A well casing having a circular cross sectional shape may be inserted into the ground by a combination vibratory and rotary driving system. The method used to insert a perforated well casing into the ground may be chosen based on several factors including, but not limited to, economics, type and toxicity of soil contamination at the remediation site, and soil formation properties.

A hole or trench may be formed in the ground for a well casing. A hole may be formed in the ground using an auger. The well casing may be placed into the hole. Several factors may be taken into account when placing well casings into augered holes or trenches within the ground. The cuttings produced during formation of the hole or trench may be treated separately. If the contamination is considered to be a hazardous waste, then the soil cuttings will also be a hazardous waste. The soil cuttings may require disposal or off-site treatment at an approved facility. Also, dust and or vapors may be generated during the formation of the augered hole or trench. Special dust and vapor containment procedures may be required which may make placement of the well casings into augered holes or trenches prohibitively expensive. Vibrating or driving a well casing into the ground may significantly reduce or eliminate dust and vapor generation during placement of the well casing into the ground.

Soil may include a number of layers. Removable material may be placed within a casing adjacent to selected layers of soil. The removable material may be removed from selected sections of the casing to independently and sequentially expose layers of the soil so that individual soil layers may be treated, injected into, or tested.

A perforated casing may be a component of a soil remediation system. In an embodiment, the soil remediation process is an in situ thermal desorption (ISTD) process. During an ISTD process, a heater is placed within the casing. Activating the heater heats the casing and the adjacent soil. The heater may be configured to heat the casing and the soil above a temperature that results in removal of removable material covering openings of the casing. The heater may be able to raise the temperature of the removable material to a temperature that opens the openings, but allows the temperature of the soil adjacent to the casing to remain below a temperature that results in migration of contaminants. When the openings are opened, a vacuum that pulls the contaminants and gas into the well may inhibit migration of contaminants. In an embodiment, the removable material and the heater may be chosen so that the heater raises the temperature of the casing and the soil to a working temperature that is sufficient to completely thermally destruct the removable material. In other embodiments, the removable material and the heater may be chosen so that the heater raises the temperature of the casing and the soil to a working temperature that is sufficient to result in the opening of the openings, but will not result in the thermal destruction of the removable material.

An advantage of a well casing that includes removable plugs or a removable sleeve over openings in the casing is that the casing may be inserted into the ground without plugging or partially plugging the openings in the casing during insertion of the casing into the soil. The removable plugs or sleeve may be dissolved by heating or chemical treatment after the casing is placed in the ground. After the plugs or sleeve are removed from the openings, off-gas may be removed from the soil through the casing if the casing is a part of a production well, or fluid may be injected into the soil through the casing if the casing is a part of an injection well.

Another advantage of a well casing that includes removable plugs or a removable sleeve over openings in the casing is that dust and/or vapor produced during an insertion procedure that places the casing in the ground will not be transported to the atmosphere through the casing. Preventing dust and vapor from passing through a casing during an insertion procedure may be critical for applications directed towards remediation of highly toxic contaminated soil. Highly toxic contaminated soils may include, but are not limited to, radioactive soils (such as plutonium contaminated soil), organic compound contaminated soil (such as dioxin contaminated soil), and/or mercury contaminated soil. Further advantages of well casings with removable plugs may include that the casings are sturdy, durable, simple, efficient, safe, reliable and inexpensive; yet the casings may also be easy to manufacture, install, and use.

BRIEF DESCRIPTION OF THE DRAWINGS

Other advantages of the invention will become apparent upon reading the following detailed description and upon reference to the accompanying drawings in which.

Figure 1:
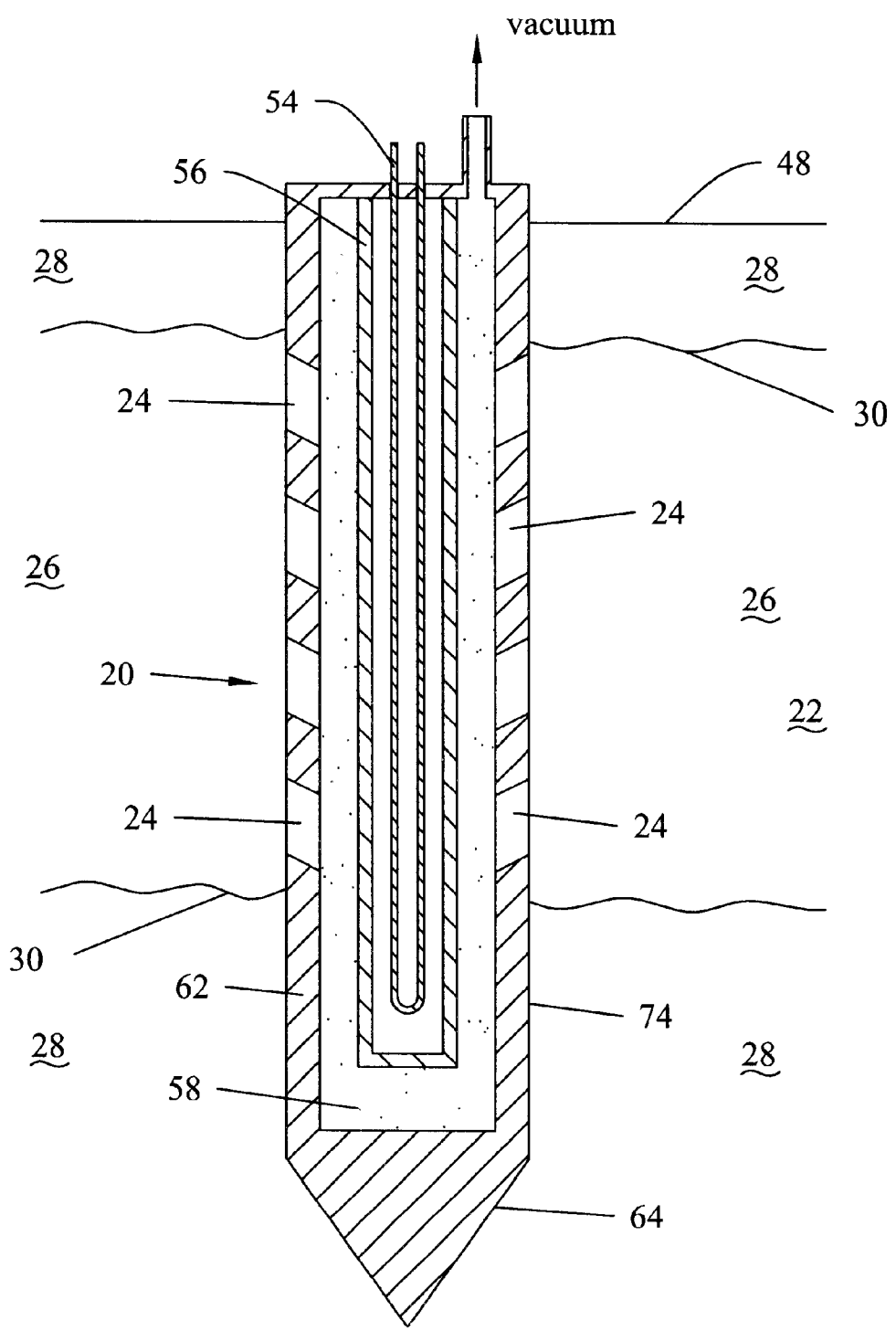
FIG. 1 shows a schematic cross sectional view of a well casing that is inserted into the ground, wherein openings in the casing are oriented upwards and outwards relative to the ground surface and an inner surface of the casing.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Referring to the drawings in general, and to FIG. 1 in particular, a well casing is designated as reference numeral 20. A well casing may be placed within soil or ground 22. The well casing 20 may include perforations or openings 24 that allow fluid to flow into or out of the well casing. Portions of the well casing 20 may be positioned adjacent to contaminated soil 26, and portions of the well casing may be adjacent to uncontaminated soil 28. Interfaces 30 may separate adjacent soil layers. The well casing 20 may be a part of a production well, an injection well, or a test well. A production well may be used to remove off-gas from contaminated soil 26. The off-gas may include air, water and contaminants that were within the soil 22. Fluid may be introduced into the soil through an injection well. The fluid may be, but is not limited to, a heat source (such as steam), a solvent that increases production from the casing 20, or drive fluids that force fluids within the soil 22 towards a production well. A drive force for injecting the fluid into the soil 22 may be supplied through the casing 20, or from an adjacent well or wells. A test well may be used to determine the structure and layering of the soil 22; to take gas samples to determine the location and concentration of contaminants; or to serve as a logging well for use with gamma ray, neutron or other types of logging tools.

Figure 2:
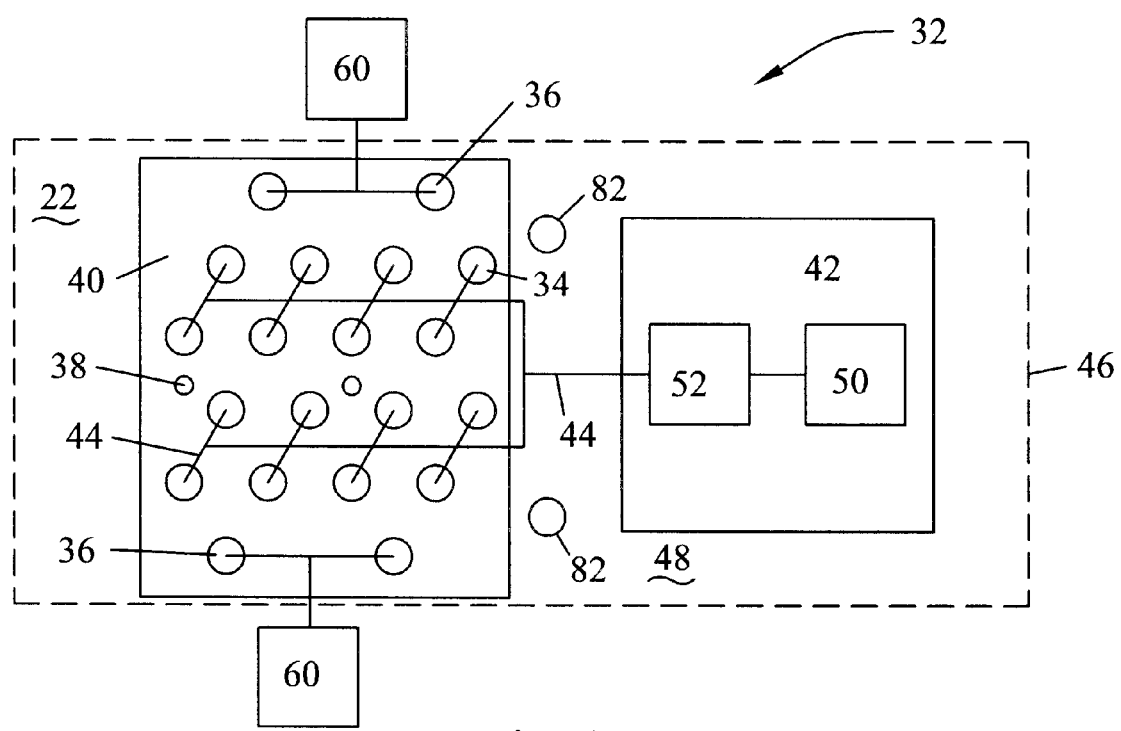
FIG. 2 is a schematic diagram of an in situ soil remediation system.

FIG. 2 depicts a schematic diagram of an embodiment of soil remediation system 32. The soil remediation system 32 may be used to treat contaminated soil. The soil remediation system 32 may remove or reduce the amount of contamination within the soil 22. The soil remediation system 32 may be, but is not limited to, a soil vapor extraction system, or an in situ thermal desorption (ISTD) remediation system. The soil remediation system 32 may include one or more production wells 34. The soil remediation system 32 may optionally include one or more injection wells 36, and one or more test wells 38. Injection wells 36 and/or test wells 38 may be located inside or outside of a pattern of production wells 34. A well casing that includes perforations or openings may be part of a production well 34, injection well 36, or test well 38 of the soil remediation system 32.

A soil remediation system 32 may include optional ground cover 40, treatment facility 42, vapor collection system 44, control system 46, and a plurality of production wells 34. The soil remediation system 32 may also include injection wells 36 and/or test wells 38. A ground cover 40 may be placed over the production wells 34 to inhibit heat loss and undesired contaminant vapor loss to the atmosphere. The ground cover 40 may also inhibit excess air from being drawn into the soil 22. The ground cover 40 may include a layer of insulation. The ground cover 40 may include a layer that is impermeable to contaminant vapor and/or air. A ground cover 40 may not be needed if the contamination is so deep within the soil 22 that heating the soil and removing off-gas from the soil will have negligible effect at ground surface 48 of the soil.

A treatment facility 42 may include a vacuum system 50 that draws an off-gas stream from soil 22. The treatment facility 42 may also include a contaminant treatment system 52 for treating contaminants within the off-gas. The contaminant treatment system 52 may eliminate contaminants from the off-gas stream, or the contaminant treatment system may reduce the contaminants to acceptable levels. The contaminant treatment system 52 may include, but is not limited to, a reactor system, such as a thermal oxidation reactor; a mass transfer system, such as activated carbon beds; or a combination of reactor systems and mass transfer systems.

A vapor collection system 44 may include a piping system that transports off-gas removed from soil 22 to a treatment facility 42. The piping system may be coupled to a vacuum system 50 and to production wells 34. In an embodiment, the piping is thermally insulated and heated. The insulated and heated piping inhibits condensation of off-gas within the piping. In alternate embodiments, the piping may be un-heated piping and/or un-insulated piping.

A control system 46 may be a computer control system. The control system 46 may monitor and control the operation of a treatment facility 42, a heated vapor collection system 44, and a plurality of production wells 34. The control system 46 may monitor and control power input into heater elements 54 (which are shown for example in FIG. 1) of the plurality of wells 34.

Production wells 34 of a soil remediation system 32 may be suction wells that are coupled to a collection system 44. The production wells 34 may be placed in a desired pattern at a remediation site. The pattern of production wells 34 may be, but is not limited to, a triangular or square well pattern. Preferably, the pattern promotes uniform heating throughout the soil 22. Spacing between the production wells 34 may be between about two to forty feet or more.

Some soil remediation systems 32 may apply heat to the soil 22. Thermal energy may be supplied to the soil 22 by, but is not limited to being supplied by, a radio frequency heating system, an electrical soil resistivity heating system, or a thermal conduction system. In an embodiment of an electrical soil resistivity heating system, electrical current may be supplied to the soil from the perforated casing 20. In other embodiments of ISTD systems 32 heater elements 54 may be placed in separate wells 82 that are offset from the production wells 34.

FIG. 1 and FIGS. 3–6 depict well casing embodiments that include heater elements 54. A heater element 54 may be a radiant heater contained within an un-perforated heater casing 56. A gravel pack 58 and/or spacers may be placed between the heater casing 56 and the heater element 54 to inhibit electrical contact of the heater element 54 with the heater casing. Alternately, no gravel pack may be positioned adjacent to the heater casing 56, and the heater casing may radiantly heat the perforated casing 20. Electrically insulating spacers may inhibit electrical contact of the heater element 54 with the heater casing 56. The heater element 54 may be connected to a power source (not shown). When power is supplied to the heater element 54, the temperature of the heater element increases, and heat is transferred to the gravel pack 54, the perforated casing 20, and to the soil 22.

As shown in FIG. 2, a soil remediation system 32 may include injection wells 36. Injection wells 36 may use pumps 60 to force material into the soil 22. Alternately, fluids may be drawn into the soil 22 through the injection wells 36 by vacuum imposed at a separate location. The injections wells 36 may also be controlled by control system 46. The material introduced into the soil 22 may be a heat source (such as steam), a reactant, a solvent, or a drive fluid that pushes formation fluid towards a production well 34. The reactant may be an oxidant. The oxidant may be, but is not limited to, air, oxygen and/or hydrogen peroxide.

Figure 10:
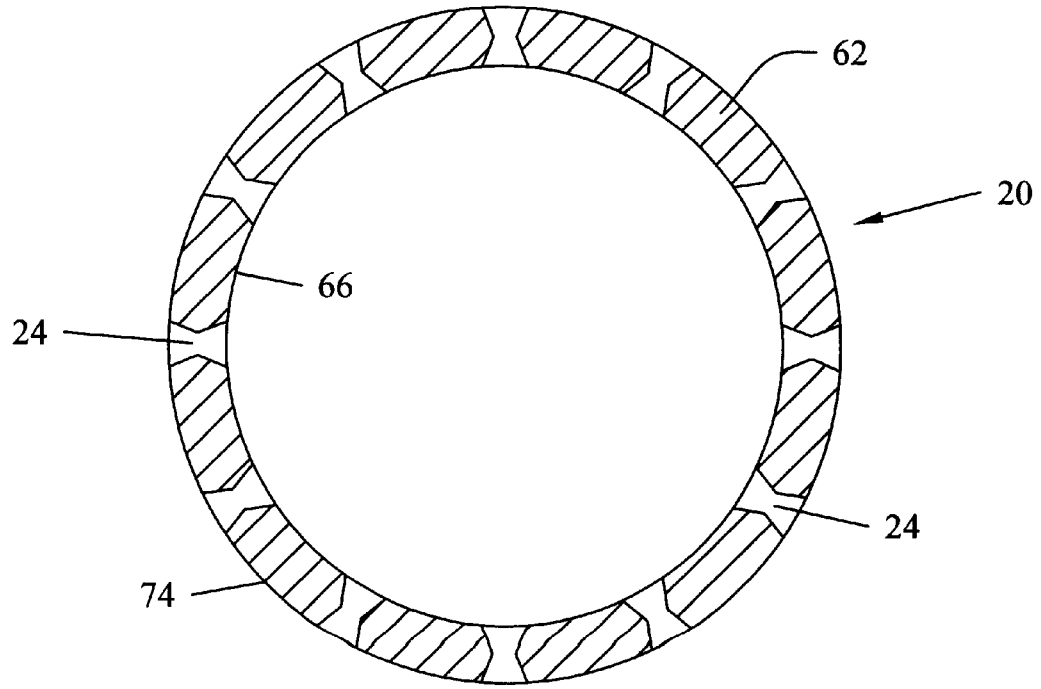
FIG. 10 shows a cross sectional view of a perforated well casing having bi-directional tapered openings that narrow towards a center of the casing wall, wherein the cross section is taken substantially perpendicular to a longitudinal axis of the casing.
Figure 11:
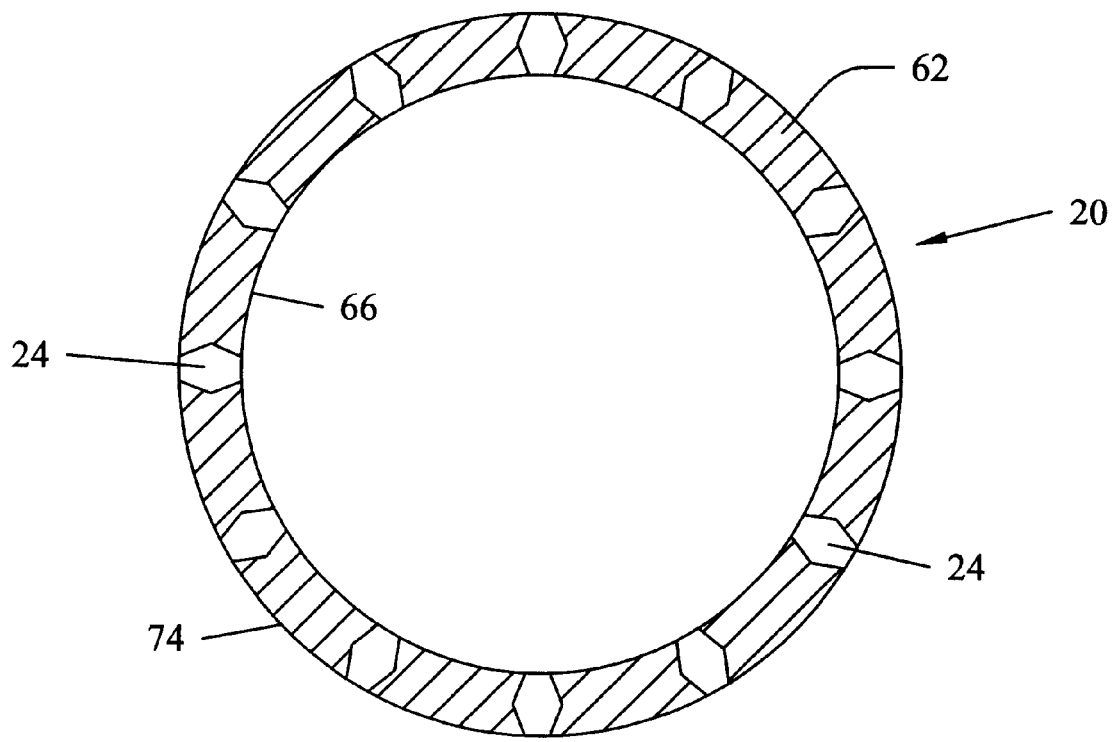
FIG. 11 shows a cross sectional view of a perforated well casing having bi-directional tapered openings that widen towards a center of the casing wall, wherein the cross section is taken substantially perpendicular to a longitudinal axis of the casing.
Figure 12:
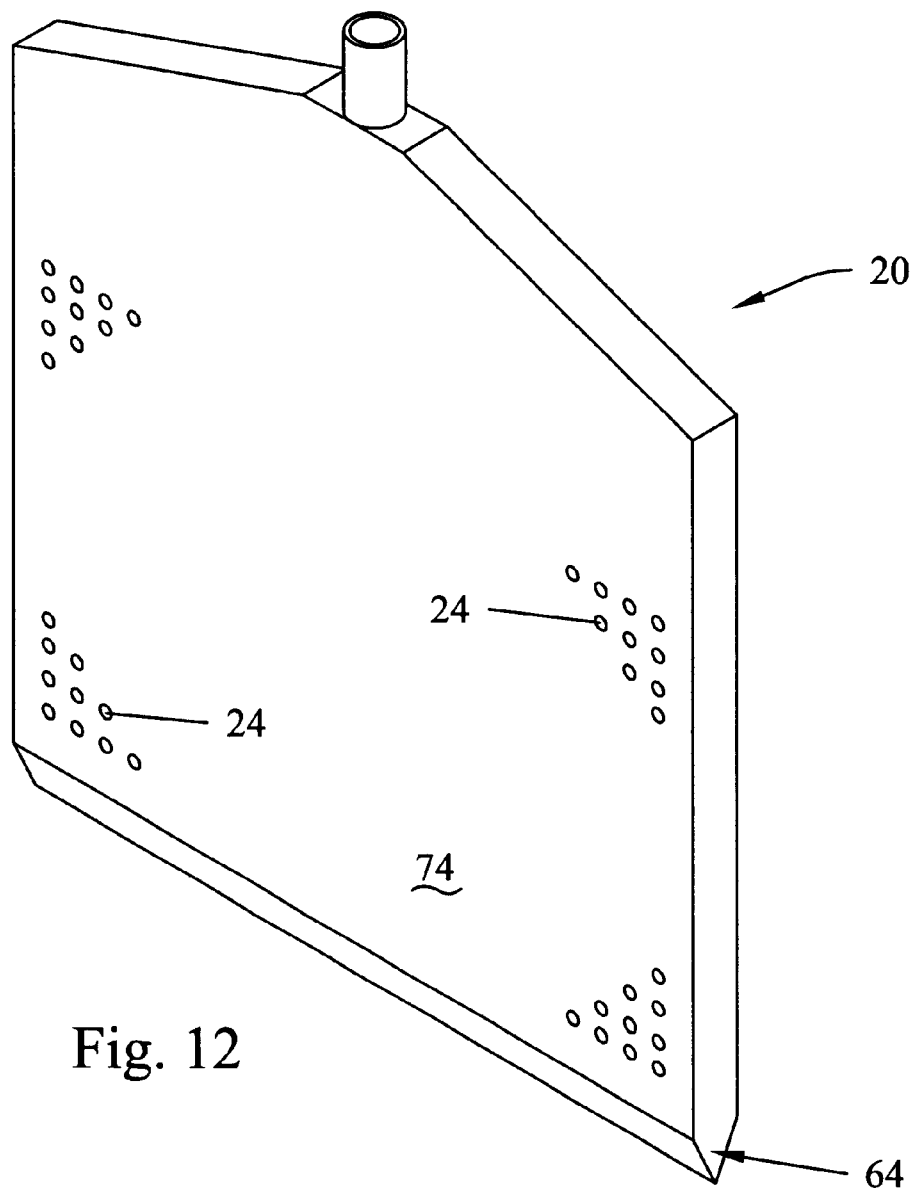
FIG. 12 is a perspective view of a well casing that is a piling, wherein only a representative sample of the openings in the casing are shown.

Well casings 20, such as the well casing embodiments shown in FIGS. 7–11, may be cylindrical sections of pipe with openings 24 formed in wall 62 of the pipe. In some embodiments, the outer diameter of the casing 20 may be as small as about one or two inches. In some embodiments, the outer diameter of the casing 20 may be greater than 10 inches. The outer diameter of the casing 20 may preferably be about four (4) to six (6) inches. FIGS. 7–11 depict cross sectional views of embodiments of cylindrical casings 20. A perforated casing 20 may have a geometric shape other than cylindrical. FIG. 12 depicts an embodiment of a box shaped perforated casing 20. U.S. Pat. No. 5,403,119 describes non-cylindrical casings 20 that may be used for soil remediation.

Figure 3:
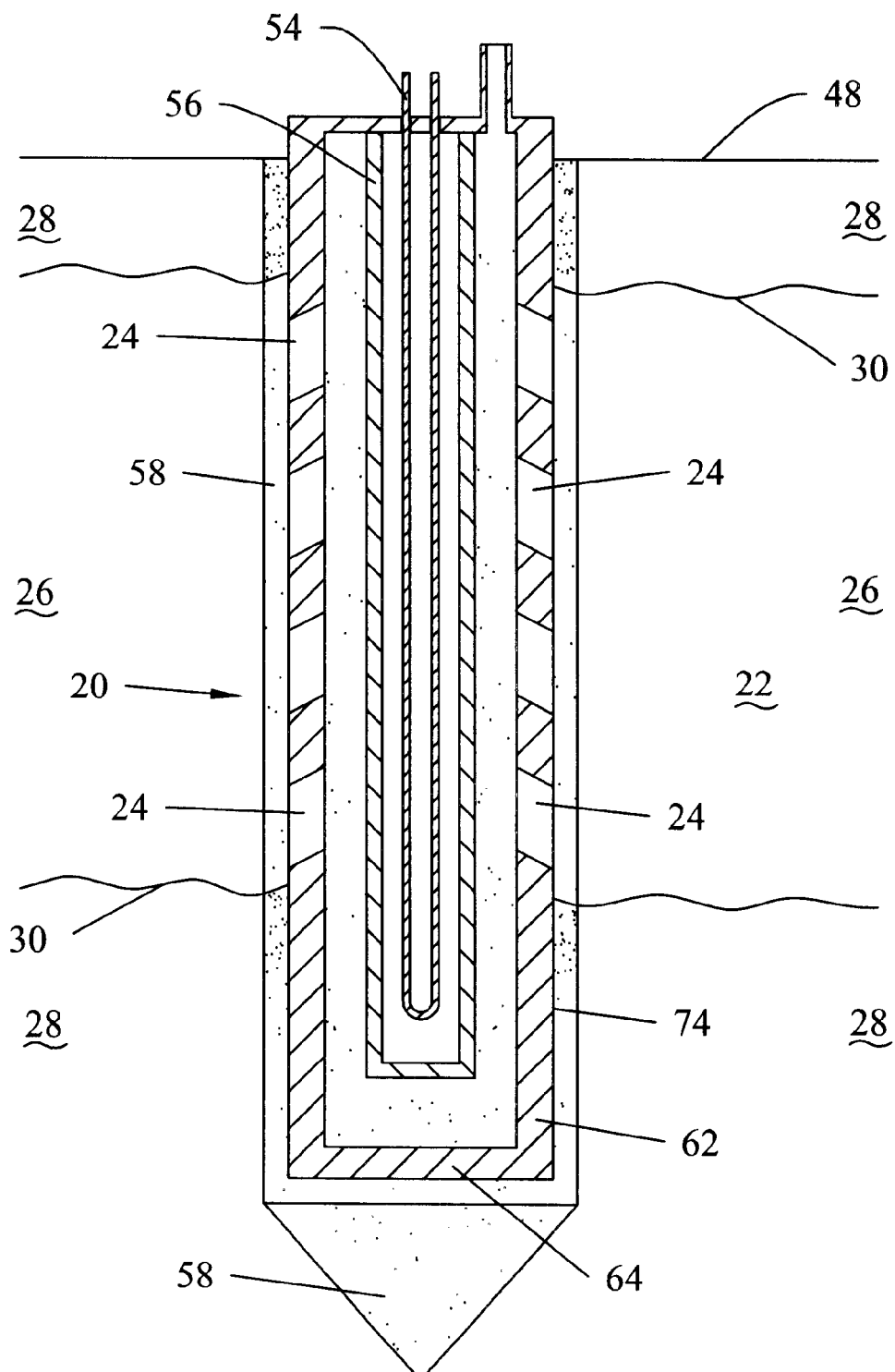
FIG. 3 shows a schematic cross sectional view of a well casing, wherein openings in the casing are oriented downwards and outwards relative to the ground surface and an inner surface of the casing.

A well casing 20, such as the well casing shown in FIG. 1, may be inserted into the ground 22 using a variety of techniques. A perforated casing 20 may be inserted, but is not limited to being inserted, by placing the casing within a well bore or trench, driving the casing into the soil 22 with a pile driver or similar equipment, or vibrationally inserting the casing into the soil. A casing 20 may be inserted into a well bore or trench. Gravel packing 58 may be placed adjacent to producing (or perforated) sections of the casing 20. Non-producing sections of the casing 20 may be cemented or sealed to the soil 22 to inhibit contamination migration and excess off-gas production through the casing. FIG. 3 depicts embodiments of well casings 20 that were installed by placing the well casing into a well bore or trench. A well bore may be produced by auguring a hole in the soil 22. Installing a casing 20 within the ground 22 by inserting the casing into a well bore or trench may be problematic. Cuttings may be produced during the formation of a well bore or a trench for a well casing 20.

If the contaminants within soil 22 are hazardous material, cuttings removed during the formation of the well bore are also hazardous material. The cuttings may require disposal or off-site treatment at an approved facility. Also, dust and/or vapors may be generated during the formation of the augered hole or trench. Exposure of workers to dust and/or vapor during well casing installation is generally disfavored. Special dust and vapor containment procedures may be used to minimize exposure of workers to dust and/or vapor. Such procedures may make placement of well casings 20 into augered holes or trenches expensive. Inhibiting dust and/or transport through the well casings 20 during insertion of the well casings into the ground 22 may obviate the need for special dust and/or vapor containment procedures and may allow the well casings to be installed economically.

A casing 20 may be driven into the ground 22 by impaction. Also, a casing 20 may be vibrated into the ground 22. A vibrational insertion method may use a rig that has eccentric cams. The eccentric cams may create vibrations in the casing 20 that are transmitted to an end 64 of the casing. The frequency of the vibrations may be at or near a resonance frequency of the casing 20. The vibrations may effectively fluidize a portion of the soil 22 adjacent to the end 64 of the casing 20. Pressure and/or rotational motion applied by the end 64 of the casing 20 to the fluidized soil allows the casing to be inserted deeper into the soil 22. Vibrating a casing 20 at or near the resonance frequency of the casing may effectively establish a seal between the casing and the soil 22 at the ground surface 48 that inhibits dust and/or vapor escaping into the atmosphere. Driving or vibrating a casing 20 into the ground 22 may reduce the generation of dust and vapor during installation of the casing. Driving or vibrating a casing 20 into the soil 22 may also eliminate the need to place a gravel pack 58 between the soil and the casing. Driving or vibrating a casing 20 into the ground 22 may be a practical method of installing a well within contaminated soil 26 that is contaminated with highly toxic material. Highly toxic material may include, but is not limited to, radioactive contaminants such as plutonium; metallic contaminants such as mercury; or hydrocarbon contaminants such as dioxin. Some casing embodiments, such as the embodiments depicted in FIGS. 1, 4–6, 12, and 14, may be impacted or vibrationally inserted into the soil 22

Figure 4:
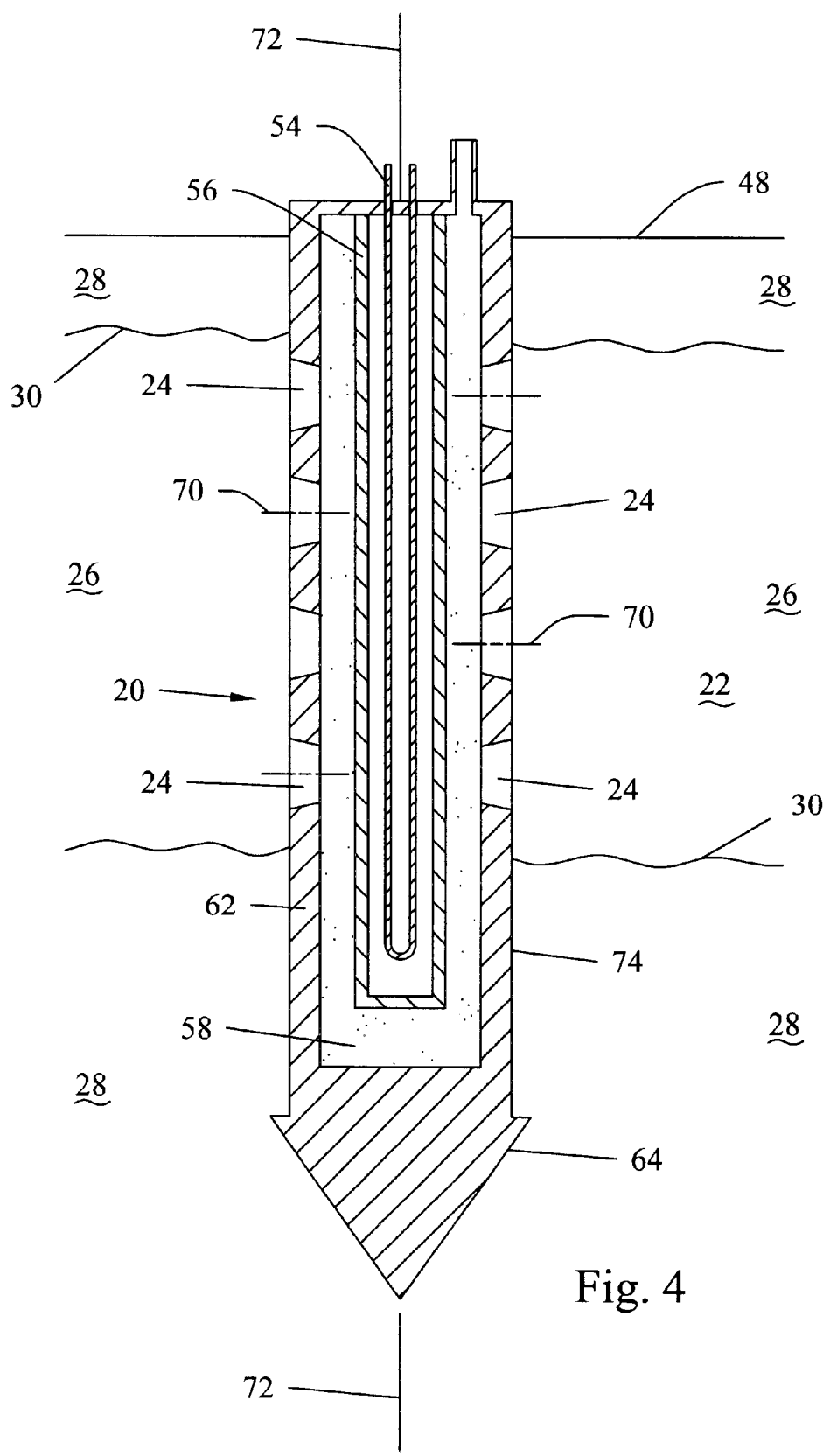
FIG. 4 shows a schematic cross sectional view of a perforated casing, wherein the openings in the casing are inwardly tapered and oriented substantially perpendicular to a longitudinal axis of the casing.

A casing 20 may have an end 64 that facilitates placing the casing into the ground 22. The end 64 may have a tapering tip. In an embodiment of a casing 20, the end 64 tapers to a point. FIGS. 1, 4–6, 12, and 14 depict embodiments of well casings 20 that have pointed ends 64. In other embodiments (not shown), the leading end of a well casing that is driven or vibrated into the ground may have a blunt or rounded tip. An end of a well casing may also include a cutting edge that helps insert the casing 20 deeper into the soil 22 when the casing is rotated. A portion of the end 64 of a casing 20 may be flared so that a maximum diameter or thickness of the end is larger than a diameter or thickness of the casing. As a maximum diameter or thickness section of an end 64 is driven into the soil 22, the soil immediately above the end may rebound towards the casing 20. The rebounding soil allows for a less compacted layer of soil to be formed immediately adjacent to the well casing 20. FIG. 4 depicts an embodiment of a well casing 20 that includes a flared end 64. FIG. 1 depicts an embodiment of a well casing 20 that does not include a flared end.

Figure 5:
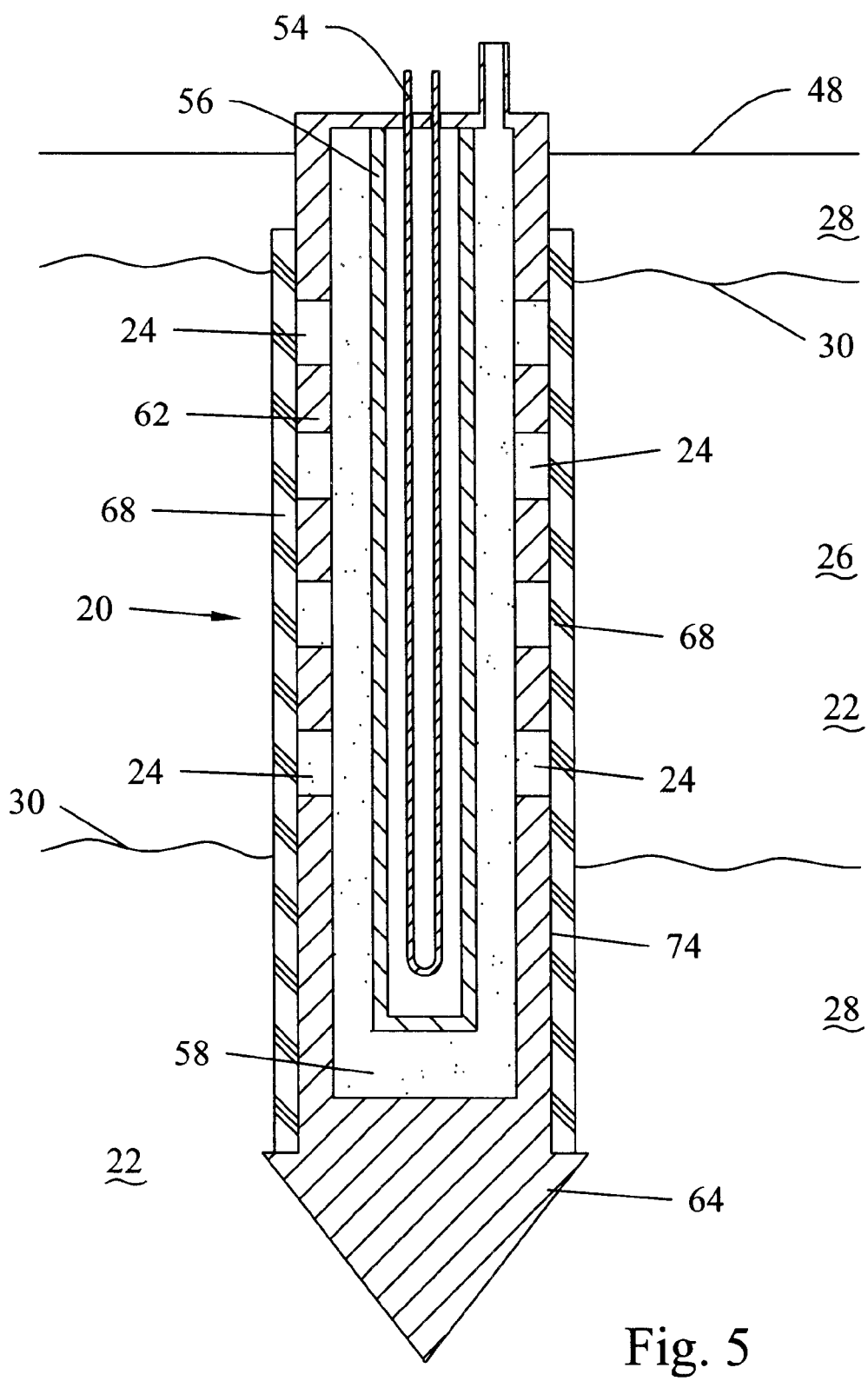
FIG. 5 shows a schematic view of a well with a sleeve placed against an outside surface of the perforated casing to cover the openings.
Figure 6:
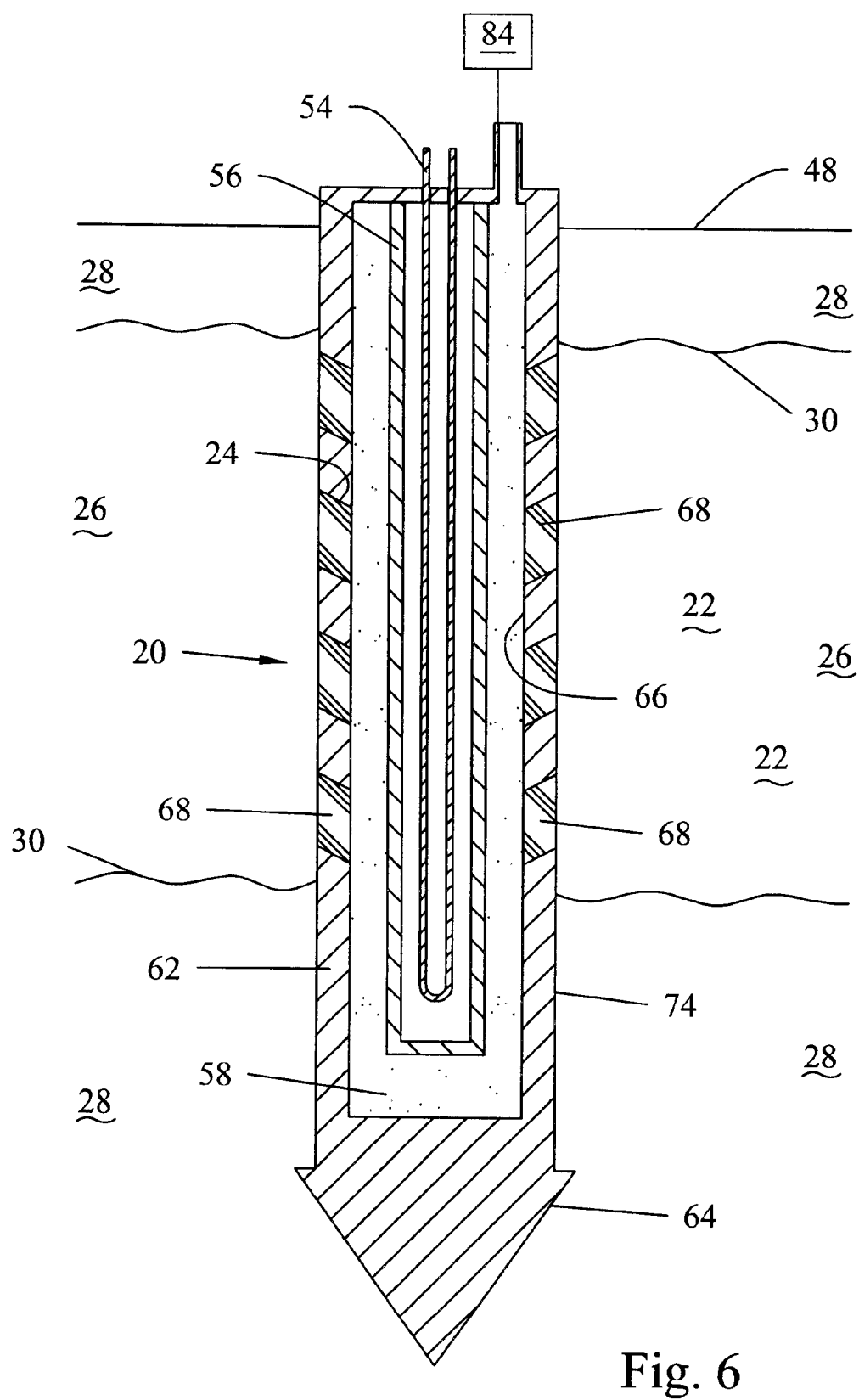
FIG. 6 shows a schematic view of a well with plugs positioned in the openings of the perforated casing.
Figure 13:
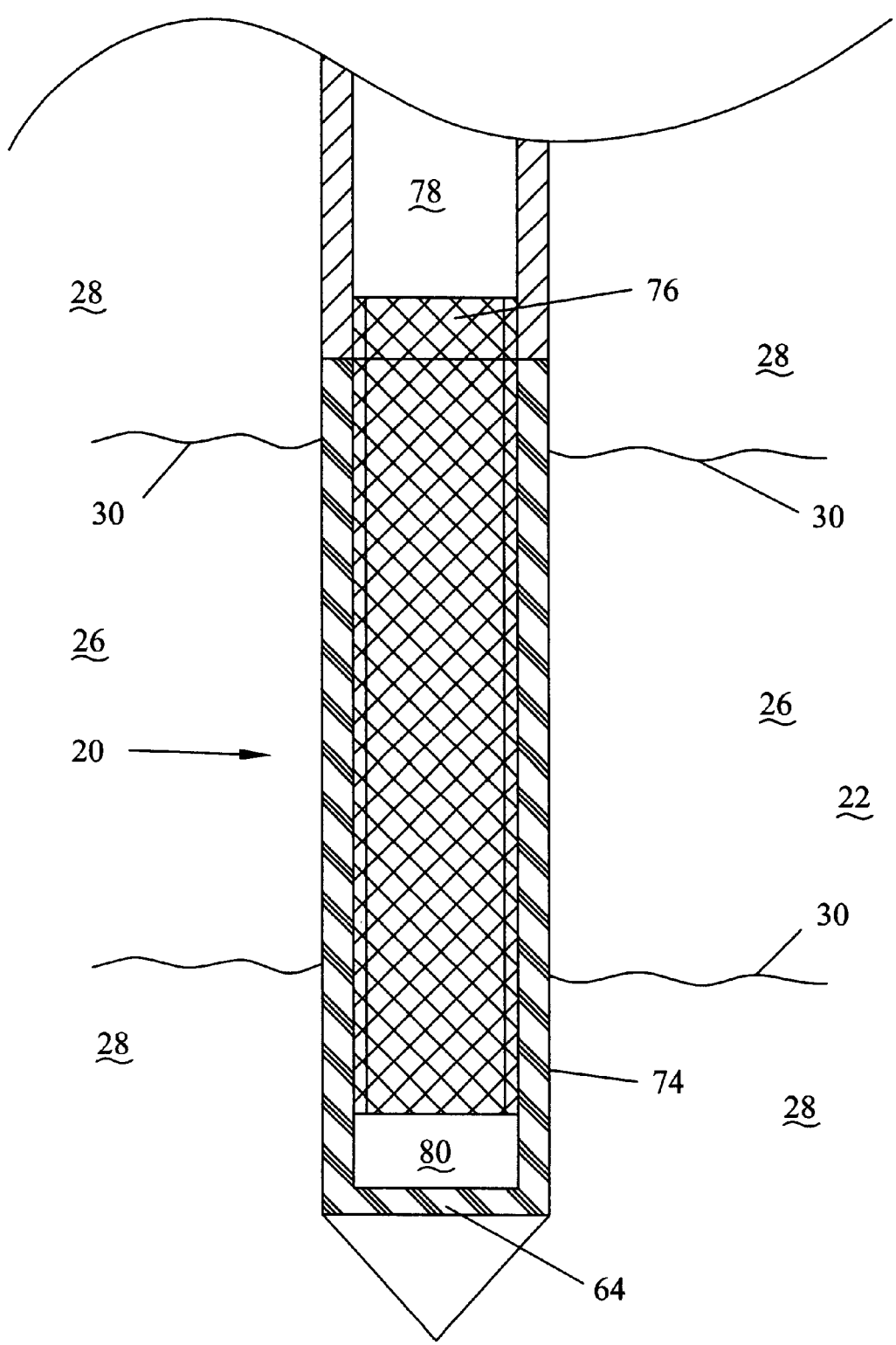
FIG. 13 shows a schematic view of a well wherein the casing is made of removable material, and a screen is positioned against an inside surface of the casing.

A perforated casing 20 may include openings 24 through casing wall 62. In an embodiment, the openings 24 may extend through casing wall 62 in an upward and outward orientation relative to ground surface 48 and inner surface 66 of the casing 20. FIG. 1 depicts an embodiment of a casing 20 having upward and outward oriented openings 24. The angle of a longitudinal axis of the openings 24 relative to a longitudinal axis of the casing 20 may range from about 45° to about 90°. Less or greater angles of the openings 24 through the casing wall 62 may also be possible. A casing 20 with upward and outward oriented openings 24 may be driven or vibrated into the soil 22 without coverings 68 over the openings 24. The upward slope of the openings 24 may inhibit soil 22 from being packed into the openings if the casing 20 is driven into the ground without any return (upward) movement of the casing during insertion. Loose debris may fall through the openings 24 to the bottom of the casing 20. In some embodiments, covering or coverings 68 are placed over the openings 24 to ensure that the openings are not plugged during insertion of the casing 20 into the ground 22. A covering 68 may be a sleeve, such as a shrink fit plastic, or a plug. FIGS. 5–6, and 13 depict embodiments of well casings 20 that have coverings 68 in place.

Openings 24 through a casing wall 62 may be oriented so that longitudinal axes 70 of the openings are substantially perpendicular to a longitudinal axis 72 of the casing 20. FIG. 4 depicts an embodiment of a casing 20 with openings that have longitudinal axes 70 that are oriented perpendicular to the longitudinal axis 72 of the casing. In some embodiments, it may be desirable to have the openings 24 extend through the casing wall 62 in a downward and outward orientation relative to the ground surface 48 and to the inner surface 66 of the casing 20. FIG. 3 depicts a perforate d casing with downwardly oriented openings.

Openings 24 in a casing wall 62 may have many different geometrical configurations. The openings 24 may be, but are not limited to circular holes, irregularly shaped holes, rectangles, polygons, or slots through the casing wall 62. In one embodiment, the openings 24 are slots. The slots have a width of about 1/16 of an inch to about 1/4 of an inch. The slots have a height of from about 1 inch to about 3 inches. Embodiments having smaller or larger slot widths and/or heights are also possible.

Figure 7:
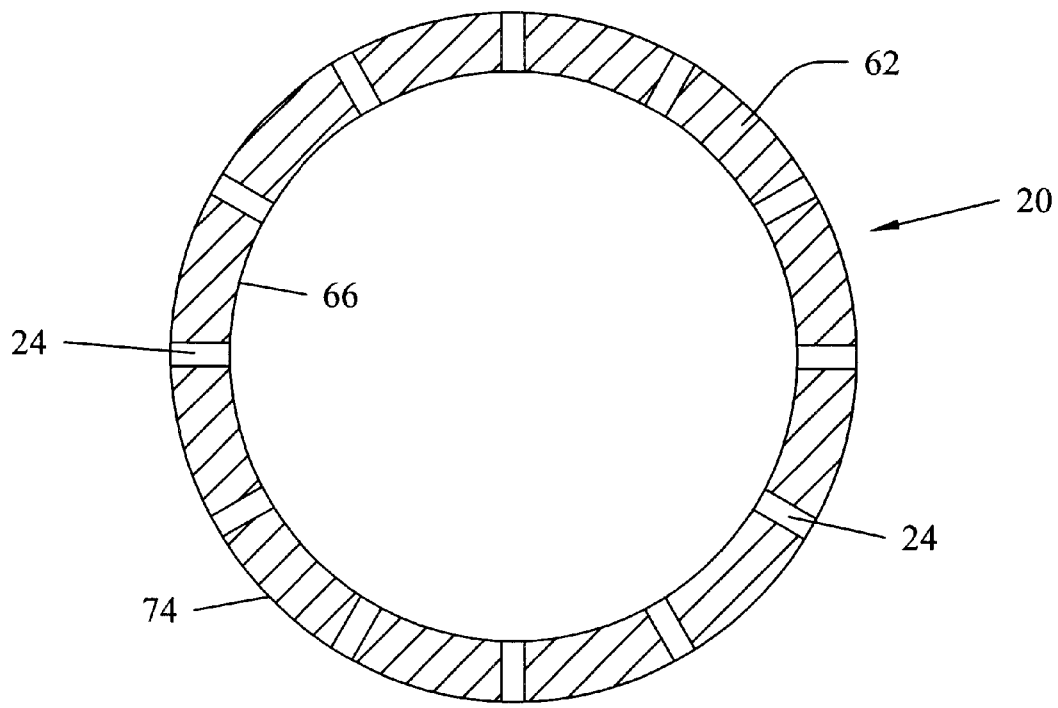
FIG. 7 shows a cross sectional view of a perforated well casing having straight openings, wherein the cross section is taken substantially perpendicular to a longitudinal axis of the casing.
Figure 8:
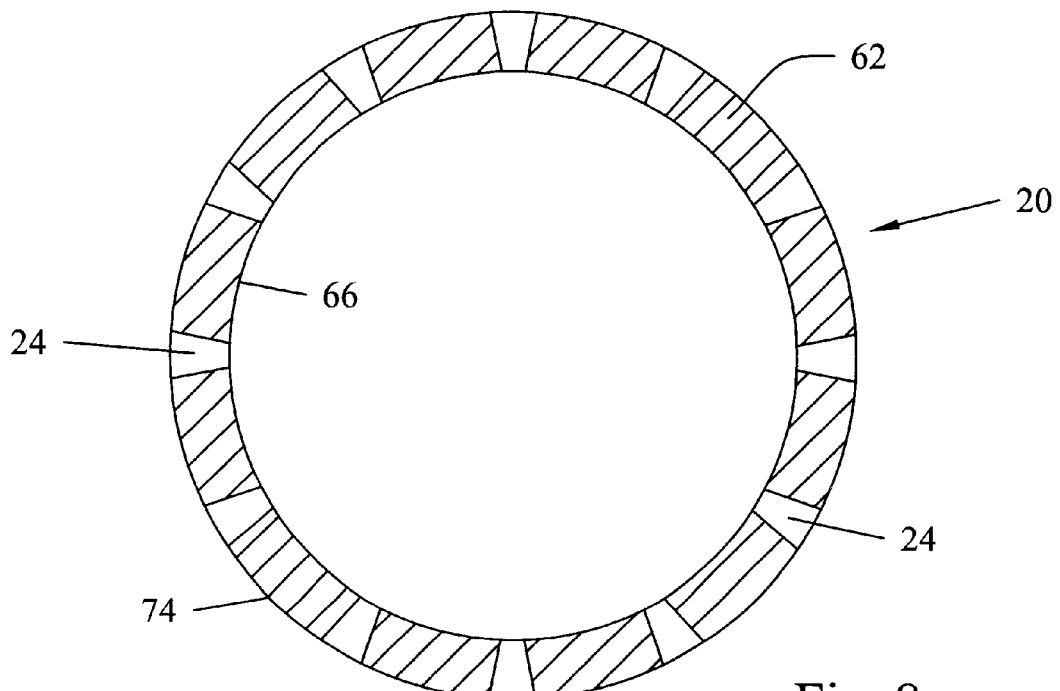
FIG. 8 shows a cross sectional view of a perforated well casing having inwardly tapered openings, wherein the cross section is taken substantially perpendicular to a longitudinal axis of the casing.
Figure 9:
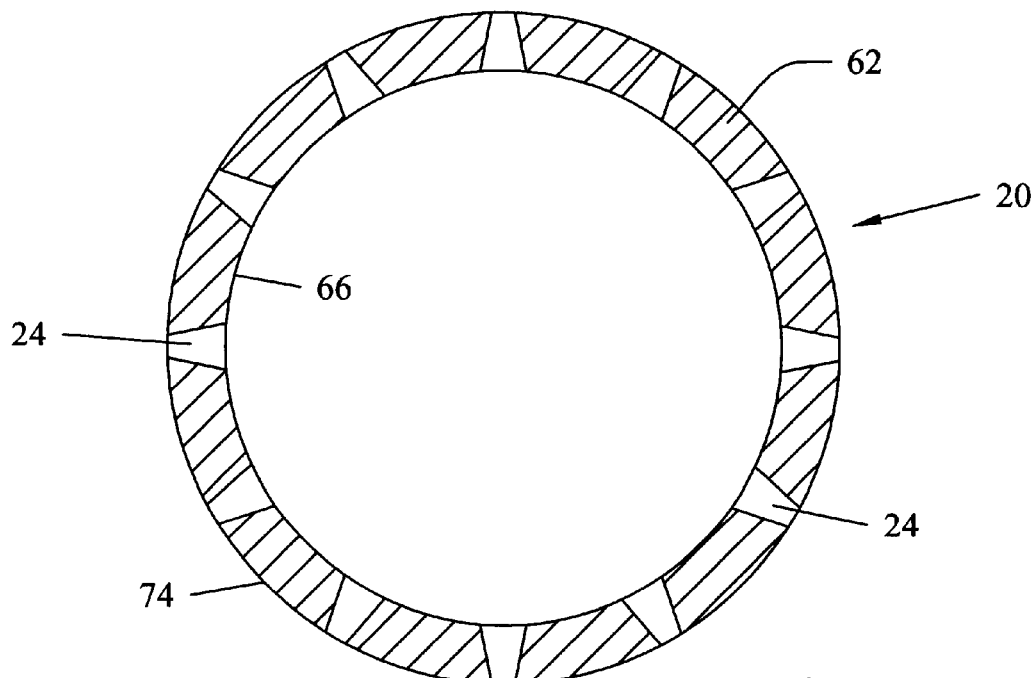
FIG. 9 shows a cross sectional view of a perforated well casing having outwardly tapered openings, wherein the cross section is taken substantially perpendicular to a longitudinal axis of the casing.

Openings 24 may be formed by many different processes. The processes may include but are not limited to, drilling, an electrical discharge machining (EDM) process, a laser cutting process, a burning process, or a drilling and cutting process. FIGS. 7–11 depict embodiments of a few of the possible geometrical configurations of openings 24. Drilled openings may be tapped to include threading. The openings 24 may be straight (as shown in FIG. 7), uni-directionally tapered (as shown in FIGS. 8 and 9), or bi-directionally tapered ( as shown in FIG. 10 and 11). Complicated patterns, such as the patterns shown in FIGS. 10 and 11, may be produced in casings 20 having thick walls. An EDM process or a laser cutting process may be used to form the complicated patterns. The EDM process may produce high quality openings 24, but using the EDM process may be more expensive. Openings 24 having other geometric shapes and configurations may also be used.

Figure 14:
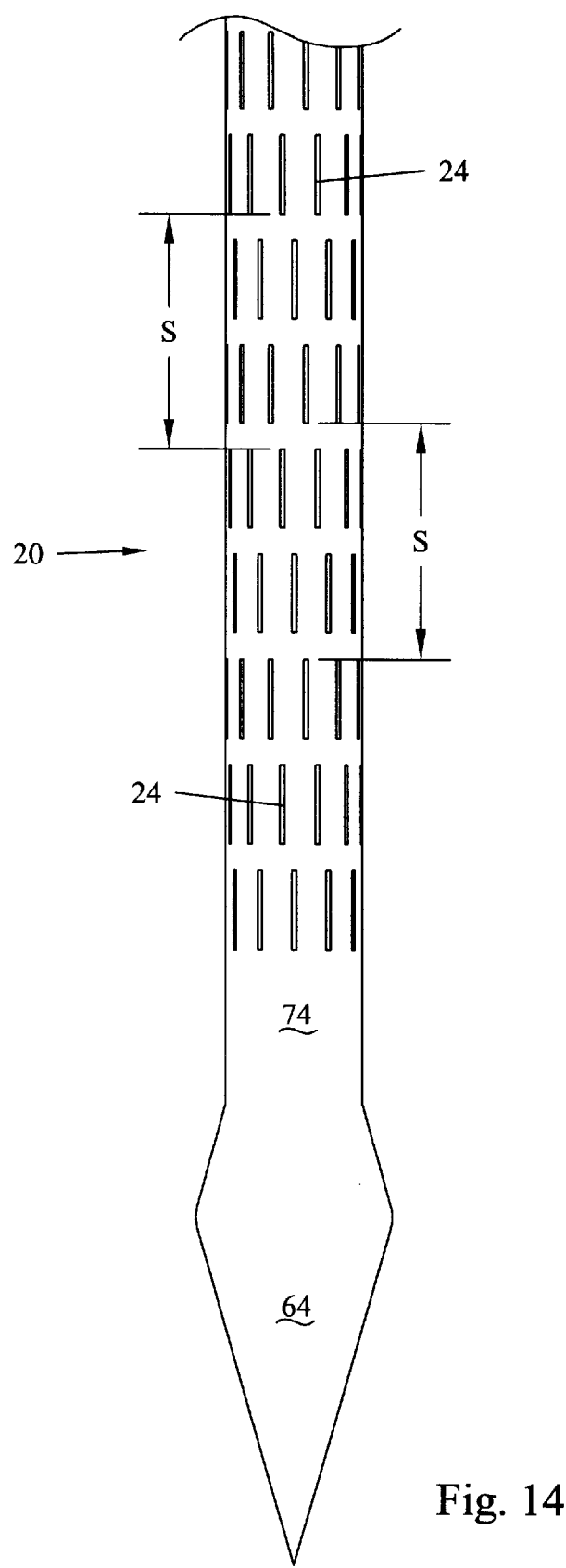
FIG. 14 is a front elevational view of a slotted casing.

A spacing may separate a portion of an opening 24 in a casing wall 62 that is positioned in-line and vertically above or below a second opening in the casing wall. The spacing between the in-line openings 24 may allow material that flows from a first opening to bypass flowing into an opening that is lower than the first opening. The first opening 24 may be separated by a distance from a second opening that is above or below the opening by one half or more lengths of the opening. The first opening 24 may be separated by a distance greater than or equal to at least one opening length from the second opening. FIG. 14 depicts a front view of an embodiment of a perforated casing 20 wherein slotted openings 24 that have portions positioned in-line above or below other openings are spaced over two opening lengths apart. A spacing between in-line and vertically positioned openings 24 is designated by reference letter S.

When a perforated casing 20 is inserted into the ground 22 it is desirable to inhibit the openings 24 of the casing from being plugged with debris. It is also desirable to inhibit transport of dust or vapor through the casing 20 to the ground surface when the casing is being installed in the soil 22. Coverings 68 for openings 24 in perforated casings 20 may be sleeves or plugs. FIG. 5 depicts a bore that has a protective sleeve 68. The sleeve 68 may be sealed to the casing 20 to inhibit dust and vapor transport through the casing during installation of the casing into the ground 22. FIG. 6 depicts an embodiment of a casing 20 with plugs 68 positioned in the openings 24. The plugs inhibit material from being packed into the openings 24 of the casing 20 during installation. The plugs also inhibit dust and vapor transport through the casing 20 during installation of the casing into the ground 22.

The coverings 68 for openings 24 may be made of removable materials. The materials may be removed by heat or by chemical treatment to allow material to pass into or out of the casing 20. The coverings 68 may be removed by heat or chemical treatment applied through the casing, or through heat or chemical treatment applied from adjacent wells. A thermally meltable covering 68 may be removed from an opening 24 by heating the covering. Heat may be supplied by a heater within the casing 20, by a fluid (such as steam) circulated within the casing, or by heat supplied from an adjacent well or wells. The heat may melt a removable covering 68 or degrade the covering to expose the opening 24. A removable covering may be degraded by oxidation or pyrolysis. A chemical treatment used to remove the coverings 68 may be, but is not limited to, exposing the covering to a reactant (such as an oxidant, acid or base) that dissolves the covering, or exposing the covering to a solvent that dissolves the covering. The chemical used to treat the coverings 68 may be circulated within the casing 20 to remove the coverings. The removable material may be a hydrocarbon, metal, metal alloy, plastic, polymer, or salt. A thermally removable material may be chosen based upon a melting or softening point of the material. The following table lists a few materials that may be used to form removable coverings 68 for openings 24 in a casing 20.

| Material | Melting/Softening Points (° F.) |
|---|---|
| Asphalt, Coal Tar Base | 150 |
| Asphalt, Petroleum Base | 165 |
| New Gel Wax - #5055 | 154 |
| Apiezon Sealing Wax - Type W | 185 |
| Hot Melt - General Purpose | 178 |
| Hot Melt - High Performance | 190 |
| Hot Melt - Extended Time | 201 |
| Hot Melt - Metal | 270 |
| Hot Melt - Electrical | 292 |
| Shoe Goo II | 350+ |
| Wood's metal | 158 |

The removable material that is used to cover openings 24 within a casing 20 may be resistant to mechanical abrasion, may be heat resistant, and may form a good seal with the casing 20 during installation of the casing in the ground 22. During installation of the casing 20 into the ground 22, the coverings 68 may be subject to abrasion. The coverings 68 may also be heated by friction and vibration during installation of the casing 20 in the ground 22. The coverings 68 should not melt or otherwise expose the openings 24 during an insertion procedure that installs the well casing 20 into the ground 22. The coverings 68 may maintain a seal with the casing 20 to inhibit plugging of the openings 24 and to inhibit transport of dust and vapor to the surface 48 through the casing during installation.

The removable material that is used to cover the openings 24 within a casing 20 should be non-toxic. The decomposition products of any portion of the removable material that may remain within the ground 22 should also be non-toxic. During removal of the coverings 68 from the openings 24, a portion of the coverings may flow into a gravel pack 58 or soil 22 adjacent to the casing 20. In some embodiments of the coverings 68, the removable material used to form the coverings is thermally or chemically destroyed during removal of the coverings from the openings 24. Some well casing opening embodiments are oriented to allow material to flow into the casing 20. In some embodiments, a portion of the melting coverings 68 or decomposition products of the melting coverings may flow into a gravel pack 58 or soil 22 adjacent to the casing 20. Preferably, the removable material or the decomposition products have wetting characteristics with the gravel pack 58 or soil 22. The wetting characteristics may help to consolidate the gravel pack 58 and/or soil 22 adjacent to the casing 20.

In one embodiment, heat is used to remove the removable material. In one embodiment, heat is applied by supplying a current from source 84 through the casing wall 62 to resistively heat the casing 20 In one embodiment, heat is applied from a heater element 54 placed inside of the casing 20 resulting in the removable material melting from an inside surface towards the outside surface. As the material melts, gravity may cause the material to flow downwards so that an upper portion of an opening 24 is exposed before a lower portion of the opening. The last portion of the material to melt may flow outwards from the casing 20 into an adjacent gravel pack 58 or soil 22. In an embodiment, a vacuum is applied to the casing 20 during removal of the meltable material. The vacuum may draw the removable material into the casing 20 so that very low residuals of the material are present in the openings 24 and in the gravel pack 58 or soil 22 adjacent to the casing.

A soil remediation system used to treat contaminated soil may be an ISTD soil remediation system. During installation of the soil remediation system, coverings 68 of well casings 20 may be made of a material that melts or is thermally degraded within a temperature range below the temperature to which the ISTD system 32 raises the soil 22. Preferably, the ISTD system 32 raises the temperature of the casing 20 and surrounding soil 22 above a temperature that will result in total removal of the coverings 68 by melting, thermal degradation and/or vaporization and vacuum removal of the coverings.

Coverings 68 may be positioned or formed in openings 24 of a casing 20 in a variety of ways. FIG. 6 depicts an embodiment of a casing with individual coverings 68 within openings 24. If the openings 24 are threaded, the coverings 68 may be threaded plugs that are screwed into the openings. If the covering s 68 are plugs, individual plugs may be inserted into openings 24 in the casing 20. The material forming the plugs may have an elastic characteristic that allows the formation of a sealed interference fit between the plugs and the casing wall 62. Also, the plugs may include flared ends (not shown) that contact an inner surface 66 of the casing 20 and hold the plugs within the openings 24. The shape of the openings 24 in the casing 20 may help to retain the plugs within the casing. For example, the openings 24 in the casing 20 may have large areas in outer surface 74 of the casing. The openings 24 may taper to smaller openings in an inner surface 66 of the casing 20. The smaller openings at the inner surface 66 of the casing 20 may inhibit the plugs from being pushed into the casing during placement of the casing into the soil 22. The smaller openings at the inner surface 66 of the casing 20 may also inhibit the plugs from being pulled into the casing if a vacuum is applied to the well. FIG. 8 depicts an embodiment of a casing 20 that has a narrowing taper that would inhibit entry of a plug into the casing.

A method of forming coverings 68 within the individual openings 24 may include flowing a liquefied material into the openings 68. FIG. 6 depicts an embodiment of a casing with individual coverings 68 within openings 24. The material would then be allowed to harden to form coverings 68. A liner may be placed against a surface of the casing 20 to facilitate the formation of the coverings 68 within the openings 24. For example, a method of filling openings 24 within a casing 20 with glue may include: 1) warming the casing, 2) blocking the openings with a purge dam or bladder positioned within the casing, 3) filling the openings with liquefied glue from a glue gun, and 4) allowing the casing and glue to cool to solidify the glue into coverings 68 within the openings. The purge dam may be expanded with a gas or a liquid.

An alternate method of covering openings 24 is to use a sleeve. FIG. 5 depicts an embodiment of a well casing 20 that includes a sleeve. Preferably, the sleeve 68 is placed and sealed to the outer surface 74 of the casing 20, although in certain embodiments, the sleeve may be an inner lining placed against an inner surface of the casing 20. The sleeve may be formed of a material that shrinks when exposed to heat. Such material may be placed around an outer surface 74 of a well casing 20 over openings 24, and the material may be exposed to sufficient heat to shrink the material so that the material shrinks and seals to the well casing. Production wells, injection wells, and/or test wells of an ISTD soil remediation system may be fitted with sleeves before the wells are inserted into the ground. The sleeves used to cover openings of the wells of the ISTD soil remediation system may be thermally destroyed during operation of the soil remediation system.

A covering 68 or coverings for openings 24 of a casing 20 may be made of a material that has a limited lifetime. For example, a covering 68 for an opening 24 may be made of a material that is configured to biodegrade and lose structural strength within a certain period of time. Alternately, a covering 68 may be premixed with an acid paste that dissolves the removable material within a certain period of time, for example, five hours. For example, the coverings for the well casing 20 depicted in FIG. 6 may be formed at a work site with a material that includes premixed acid paste. The coverings 68 may be allowed to harden, and the casing 20 may be inserted into the soil 22. After the set period of time, the acid paste will destroy the structural integrity of the covering and the well casing 20 will be opened.

Openings 24 may be formed in different sections of a casing 20. Different sections of openings 24 may be positioned adjacent to various layers of soil 22. The openings 24 may all be opened at one time so that all of the soil 22 is treated, injected into, or tested at one time. Alternately, only selected sections of openings 24 may be opened at a particular time to expose only particular portions of soil 22 or soil layers. The exposed portions of soil 22 may be treated, injected into, or tested. If only selected openings 24 are to be opened, previously opened openings may be sealed, and coverings 68 of openings that are not to be opened may be protected. Opened sections of casing 20 may be sealed by forming plugs above and/or below opened sections of casing. The plugs may be cemented or otherwise sealed in place. Unopened sections of casing 20 may be protected by inserting a protective liner adjacent to coverings 68. The protective liner could be removed when the coverings 68 are to be opened. The liner may be removably sealed to the inside surface 66 of the casing wall 62 during use.

A casing 20 may include packing or screen 76. A screen 76 within a casing 20 is depicted in FIG. 13. In an embodiment, the casing 20 includes a mesh screen 76. The mesh screen 76 may have openings that are filled with a removable material before or after placement of the screen within the casing 20. In an alternate embodiment, the casing includes a wire wrap screen. The openings between the wraps may be filled with removable material. In addition to the openings in the screen 76, openings in a wall 62 of a casing 20 that has screen may also be filled with removable material. A casing 20 may include packing. For example, a portion of the casing 20 may be packed with sintered porous metal bead packing. The packing may be filled or blocked with removable material prior to installation of the casing into the ground.

In an embodiment, material that forms a casing wall 62 or a portion of the casing wall is removable material. FIG. 13 depicts an embodiment of a well wherein a portion of the material forming the casing wall 62 is configured to be removed. The casing wall forms a central chamber that inhibits entry or exit of material from the casing during insertion of the casing into the soil 22. First portion 78 of the casing 20 may be formed of a metal pipe, such as a steel pipe. A second portion 80 of the casing 20 may be formed of a plastic section of pipe. The second portion 80 may be made of, but is not limited to, polyethylene or polyvinyl chloride. Packing or a screen 76 may be positioned within the second portion 80 of casing 20 and may be sealed to the first section 78. After insertion into the soil 22, sections or all of the second portion 80 of the casing 20 may be removed by chemical or heat treatment. The removed sections may allow fluid and/or vapor to be removed from or inserted into the soil.

To insert a perforated well casing 20 into the ground 22, openings 24 in the casing are sealed with a removable cover or coverings 68. The openings 24 may be sealed with individual plugs, or a sleeve may be placed adjacent to the openings. The well casing 20 may be placed in the ground 22. The well casing 20 may be placed in the ground 22 by inserting the well casing 20 into a well bore, by impaction, and/or by vibrational insertion. After the well casing 20 is inserted into the ground 22, the coverings 68 may be removed from the openings 24. If the removable cover or coverings 68 are thermally meltable, the casing 20 may be heated to remove the coverings. Heating the casing 20 may be performed by, but is not limited to being performed by, engaging a heating system or by injecting a heated fluid into the casing. If chemical treatment is required to remove the removable cover or coverings 68, a chemical treatment fluid may be circulated within the casing 20 to dissolve the coverings. After the coverings 68 are removed, fluid may be removed from the soil 22 through openings 24 in the casing 20. Alternately, fluid may be injected into the soil 22 through the openings 24 in the casing 20.

It is to be understood that the technology described herein may be used for soil remediation or the remediation of other media (e.g., other solids, liquids, sludges, etc.). In this context remediation means the act of removing contaminants/hazardous materials, or transforming contaminated/hazardous materials into less contaminated/ hazardous materials.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of establishing an elongated conduit that allows for flow of fluid into or out of soil to be remediated, comprising:

applying heat to the elongated conduit from at least one well external to the elongated conduit;

wherein applying heat to the elongated conduit comprises heating the well, transferring heat from the well to the soil, and transferring heat from the soil to the elongated conduit; and wherein the heat applied to the elongated conduit at least partially removes material positioned in openings in the elongated conduit to open the elongated conduit to allow fluid flow into or out of the elongated conduit, and wherein the material is positioned in the openings before insertion of the elongated conduit into the soil.

2. The method of claim 1, further comprising melting a portion of the material with the heat applied to the elongated conduit.

3. The method of claim 1, further comprising thermally degrading a portion of the material with the heat applied to the elongated conduit.

4. The method of claim 1, wherein the heat applied to the elongated conduit facilitates oxidation of at least a portion of the material blocking the openings.

5. The method of claim 1, wherein applying heat to the elongated conduit comprises introducing steam into the soil from at least one well.

6. The method of claim 1, further comprising pulling a vacuum within the elongated conduit to draw fluid into the elongated conduit when openings of the elongated conduit are opened.

7. The method of claim 1, further comprising consolidating packing or soil adjacent to the elongated conduit with melted material from the openings.

8. The method of claim 1, further comprising consolidating packing or soil adjacent to the elongated conduit with thermally degraded material from the openings.

9. The method of claim 1, wherein the material comprises a polymer.

10. The method of claim 1, wherein the material comprises a metal.

11. The method of claim 1, wherein the material comprises a hydrocarbon.

12. The method of claim 1, wherein heating well comprises applying heat to the well from an electrical heater.

13. A method of establishing an elongated conduit that allows for flow of fluid into or out of soil to be remediated, comprising:
   applying an electrical current to the elongated conduit to resistively heat the conduit;
   wherein heat applied to the elongated conduit by resistive heating at least partially removes material positioned in openings in the elongated conduit to open the elongated conduit to allow fluid flow into or out of the elongated conduit, and wherein the material is positioned in the openings before insertion of the elongated conduit into the soil; and
   consolidating packing or soil adjacent to the elongated conduit with melted material from the openings.

14. The method of claim 13, further comprising melting a portion of the material with the heat applied to the elongated conduit.

15. The method of claim 13, further comprising thermally degrading a portion of the material with the heat applied to the elongated conduit.

16. The method of claim 13, wherein the heat applied to the elongated conduit facilitates oxidation of at least a portion of the material blocking the openings.

17. The method of claim 13, further comprising pulling a vacuum within the elongated conduit to draw fluid into the elongated conduit when openings of the elongated conduit are opened.

18. The method of claim 13, further comprising consolidating packing or soil adjacent to the elongated conduit with thermally degraded material from the openings.

19. The method of claim 13, wherein the material comprises a polymer.

20. The method of claim 13, wherein the material comprises a metal.

21. The method of claim 13, wherein the material comprises a hydrocarbon.

22. The method of claim 13, wherein the openings in the elongated conduit comprise slits in the conduit, and wherein long axes of the slits are oriented substantially parallel to a longitudinal axis of the elongated conduit.

23. A method of establishing an elongated conduit that allows for flow of fluid into or out of soil to be remediated, comprising:
   applying heat to the soil from at least one well external to the elongated conduit; wherein applying heat to the soil comprises heating the at least one well, and transferring heat from the at least one well to the soil; and
   exposing openings in the elongated conduit by removing a sleeve abutting the elongated conduit that blocks the openings with heat supplied from the at least one well, wherein the sleeve is placed in a position to block the openings before insertion of the elongated conduit into the soil.

24. The method of claim 23, wherein exposing the openings comprises melting at least a portion of the sleeve.

25. The method of claim 23, wherein exposing the openings comprises thermally degrading a portion of the sleeve.

26. The method of claim 23, wherein the heat applied to the soil facilitates oxidation of at least a portion of sleeve.

27. The method of claim 23, wherein applying heat to soil comprises introducing steam into the soil from the at least one well.

28. The method of claim 23, further comprising pulling a vacuum within the elongated conduit to draw fluid into the elongated conduit when openings of the elongated conduit are exposed.

29. The method of claim 23, further comprising consolidating packing or soil adjacent to the elongated conduit with melted material from the sleeve.

30. The method of claim 23, further comprising consolidating packing or soil adjacent to the elongated conduit with thermally degraded material from the sleeve.

31. The method of claim 23, wherein the sleeve is positioned against an inner wall of the elongated conduit.

32. The method of claim 23, wherein the sleeve is positioned against an outer wall of the conduit.

33. The method of claim 23, wherein the sleeve comprises a metal.

34. The method of claim 23, wherein the sleeve comprises a polymer.

35. The method of claim 23, wherein the sleeve comprises a hydrocarbon.

36. The method of claim 23, wherein the openings in the elongated conduit comprise slits in the conduit, and wherein long axes of the slits are oriented substantially parallel to a longitudinal axis of the elongated conduit.

37. A method of establishing an elongated conduit that allows for flow of fluid into or out of soil to be remediated, comprising:
   applying an electrical current to the elongated conduit to resistively heat the conduit;
   wherein heat applied to the elongated conduit by resistive heating at least partially removes a sleeve that blocks openings in the elongated conduit to open the elongated conduit to allow fluid flow into or out of the elongated conduit, and wherein the sleeve is positioned to block the openings before the elongated conduit is inserted into the soil; and
   consolidating packing or soil adjacent to the elongated conduit with melted material from the sleeve.

38. The method of claim 37, further comprising melting a portion of the sleeve with the heat applied to the elongated conduit.

39. The method of claim 37, further comprising thermally degrading a portion of the sleeve with the heat applied to the elongated conduit.

40. The method of claim 37, wherein the heat applied to the elongated conduit facilitates oxidation of at least a portion of the sleeve.

41. The method of claim 37, further comprising pulling a vacuum within the elongated conduit to draw fluid into the elongated conduit when openings of the elongated conduit are opened.

42. The method of claim 37, further comprising consolidating packing or soil adjacent to the elongated conduit with thermally degraded material from the sleeve.

43. The method of claim 37, wherein the sleeve comprises a metal.

44. The method of claim 37, wherein the sleeve comprises a polymer.

45. The method of claim 37, wherein the openings in the elongated conduit comprise slits in the conduit, and wherein long axes of the slits are oriented substantially parallel to a longitudinal axis of the elongated conduit.

46. A method of establishing an elongated conduit that allows for flow of fluid into or out of soil to be remediated, comprising:

introducing a chemical into the soil from one or more wells adjacent to the elongated conduit;

contacting the elongated conduit with a portion of the chemical to react the chemical with material placed in openings in the elongated conduit, wherein the material is placed in the openings before insertion of the conduit into the soil;

wherein the reaction between the chemical and the material at least partially removes some of the material from the openings to open the elongated conduit to fluid flow into or out of the elongated conduit; and consolidating packing or soil adjacent to the elongated conduit with melted material from the sleeve.

47. The method of claim 46, wherein the chemical is a solvent for the material in the openings.

48. The method of claim 46, wherein the chemical chemically reacts with the material in the openings to at least partially decompose the material.

49. The method of claim 46, wherein the chemical oxidizes at least a portion of the material in the openings.

50. The method of claim 46, wherein the chemical comprises an acid that decomposes at least a portion of the material in the openings.

51. The method of claim 46, wherein the chemical comprises a base that decomposes at least a portion of the material in the openings.

52. The method of claim 46, further comprising pulling a vacuum within the elongated conduit to draw fluid into the elongated conduit when one or more openings of the elongated conduit are opened.

53. The method of claim 46, further comprising consolidating packing or soil adjacent to the elongated conduit with chemically degraded material from the openings.

54. The method of claim 46, wherein the material comprises a hydrocarbon.

55. The method of claim 46, wherein the material comprises a polymer.

56. The method of claim 46, wherein the material comprises a metal.

57. The method of claim 46, wherein the material comprises a salt.

58. The method of claim 49, wherein the openings in the elongated conduit comprise slits in the conduit, and wherein long axes of the slits are oriented substantially parallel to a longitudinal axis of the elongated conduit.

59. A method of establishing an elongated conduit that allows for flow of fluid into or out of soil to be remediated, comprising:

introducing a chemical into the soil from one or more wells adjacent to the elongated conduit;

contacting a sleeve that blocks openings of the elongated conduit with a portion of the chemical to react the chemical with the sleeve and expose at least some of the openings, wherein the sleeve is positioned to block the openings before the elongated conduit is inserted into the soil; and consolidating packing or soil adjacent to the elongated conduit with melted material from the sleeve.

60. The method of claim 59, wherein the chemical is a solvent for the sleeve.

61. The method of claim 59, wherein the chemical chemically reacts with the sleeve to at least partially decompose the sleeve.

62. The method of claim 59, wherein the chemical oxidizes at least a portion of the sleeve.

63. The method of claim 59, wherein the chemical comprises an acid that decomposes at least a portion of the sleeve.

64. The method of claim 59, wherein the chemical comprises a base that decomposes at least a portion of the sleeve.

65. The method of claim 59, further comprising pulling a vacuum within the elongated conduit to draw fluid into the elongated conduit when one or more openings of the elongated conduit are opened.

66. The method of claim 59, further comprising consolidating packing or soil adjacent to the elongated conduit with chemically degraded material from the sleeve.

67. The method of claim 59, wherein the openings in the elongated conduit comprise slits in the conduit, and wherein long axes of the slits are oriented substantially parallel to a longitudinal axis of the elongated conduit.

* * * * *